(12) United States Patent
Kamal

(10) Patent No.: US 12,002,348 B2
(45) Date of Patent: Jun. 4, 2024

(54) COMPUTING METHOD

(71) Applicant: Andrew Magdy Kamal, Washington Townshup, MI (US)

(72) Inventor: Andrew Magdy Kamal, Washington Townshup, MI (US)

( * ) Notice: Subject to any disclaimer, the term of this patent is extended or adjusted under 35 U.S.C. 154(b) by 3 days.

(21) Appl. No.: 17/882,587

(22) Filed: Aug. 7, 2022

(65) Prior Publication Data

US 2024/0046776 A1 Feb. 8, 2024

(51) Int. Cl.
*G08C 17/02* (2006.01)
*G06F 15/78* (2006.01)

(52) U.S. Cl.
CPC ............. *G08C 17/02* (2013.01); *G06F 15/78* (2013.01)

(58) Field of Classification Search
CPC ................................ G08C 17/02; G06F 15/78
See application file for complete search history.

(56) References Cited

U.S. PATENT DOCUMENTS

| | | | | |
|---|---|---|---|---|
| 9,367,683 B2 * | 6/2016 | Kolacinski | ............. | G06N 20/00 |
| 10,362,955 B2 * | 7/2019 | Arunachalam | ........ | A61B 5/361 |
| 11,416,249 B2 * | 8/2022 | Covaci | ................... | G06F 9/3836 |
| 2015/0169026 A1 * | 6/2015 | Bodas | .................... | G06F 1/3209 |
| | | | | 713/320 |
| 2015/0172539 A1 * | 6/2015 | Neglur | ................... | H04N 23/90 |
| | | | | 348/222.1 |
| 2015/0182118 A1 * | 7/2015 | Bradbury | ................. | A61P 27/02 |
| | | | | 600/431 |
| 2016/0058409 A1 * | 3/2016 | Mizukami | ............ | A61B 8/0891 |
| | | | | 600/438 |
| 2016/0239313 A1 * | 8/2016 | Kurabayashi | ......... | G06F 9/4405 |
| 2016/0266366 A1 * | 9/2016 | Chung | .................. | G02B 21/008 |
| 2016/0298276 A1 * | 10/2016 | Chang | .................... | D06B 23/00 |
| 2017/0031844 A1 * | 2/2017 | de Rochemont | ... | G06F 9/30098 |
| 2021/0042112 A1 * | 2/2021 | Covaci | .................... | G06F 9/3001 |
| 2021/0059565 A1 * | 3/2021 | Morris | .................... | G06V 40/25 |
| 2023/0211793 A1 * | 7/2023 | Mosher | ..................... | G07C 5/02 |
| | | | | 701/29.2 |

OTHER PUBLICATIONS

Zhou et al.,. "Characterizing Network Anomaly Traffic with Euclidean Distance-Based Multiscale Fuzzy Entropy", Security and Communication Networks, vol. 2021, Jun. 16, 2021.*

Bandt et al., "Permutation Entropy: A Natural Complexity Measure for Time Series", Physical Review Letters, vol. 88, No. 17, Apr. 29, 2002.*

Szymanski , The "Cyber Security via Determinism" Paradigm for a Quantum Safe Zero Trust Deterministic Internet of Things (IoT), May 2022.*

(Continued)

*Primary Examiner* — Todd L Barker

(57) ABSTRACT

A computing method comprising the use of a type of integrated circuit that implements application specific instructions for processing computation on a deterministic pattern based off inner signal communication. Whereas this architecture for a chipset design can connect to other similar architecture chipsets and process data asynchronously and in parallel. As signals are being transmitted across any networking protocol, data is processed through network packets for computationally valid connectivity events as in signal in and signal out.

8 Claims, 7 Drawing Sheets

(56) References Cited

OTHER PUBLICATIONS

Bochet et al., "Perference Maniulations lead to the unform rule", Apr. 6, 2008.*
Cuykendall, "Kolmogorov Informantion and VLSI Lower Bounds", IP.COM, Apr. 19, 2007.*
Durand_Lose, "The Signal Point of View: From Cellular Automata to Signal Machines", 2008_.*
Martin et al., "SEPIA: Security through Private Information Aggregation", Feb. 2010.*
Brimkov et al., "On the Compleixty of Integer Programming in the Blum-Shub-Smale Computational Model", 2000.*

* cited by examiner

COMPUTING METHOD

FIELD OF INVENTION

The present invention relates to a computation method in an IT infrastructure and more particularly, a computation method which utilizes integrated circuits that implement application specific instructions for processing computation on a deterministic pattern, based off inner signal communication.

BACKGROUND OF INVENTION

During the early years of the development of computer systems, the first computers that were produced at that time were quite bulky. As industrial and technological innovation advanced, inventors have been able to squeeze computer parts into more compact structures. This was made possible with the introduction of Integrated Circuits (IC) or microchips as they are popularly known in the field.

Traditional computational methods or techniques, (although quite effective in operation) are not devoid of shortcomings or limitations, and in some cases may not provide adequate data processing speeds or length of transmission lines.

However in an IT infrastructure, it is desirable to have a computational method wherein there are longer transmission lines for mesh networking capabilities; faster communication modules to be utilized for network packet processing in board; and lightweight features, but a slower network to be utilized for small data payloads.

Furthermore, it is also desirable to have a method of computation whereby the core of the invention involves a signal computation and transmission method as a form of computing.

In order to overcome the aforementioned shortcomings and to achieve the objectives highlighted above, this present invention provides a method which utilizes integrated circuits that implement application specific instructions for processing computation on a deterministic pattern. This method stores information as signals utilizing similar mathematical principles as seen in the process of multiscale entropy.

SUMMARY OF INVENTION

The ultimate aim of this present invention is to provide the fastest possible computing method via a type of integrated circuit (also known as microchips or simply chips) that implements application specific instructions for processing computation on a deterministic pattern, based off inner signal communication. This objective also includes longer transmission lines for mesh networking capabilities, faster communication modules to be utilized for in board network packet processing and lightweight features whereby a slow network can be utilized for small data payloads.

Whereas, this architecture for a chipset design can connect to other similar architecture chipsets and process data asynchronously and in parallel.

Under this method of computing, information is stored in signals which is a computational variation of multiscale entropy rather than just 0s and 1s for computation. As signals are being transmitted across any networking protocol, data is processed through network packets for computationally valid connectivity events as in signal in and signal out. The signal analysis depends on the different signals being processed as well as the datasets (as in time series analysis of signal in and signal out, and predictable computational complexity of signal), and anybody can create firmware architecture that implements Multiscale entropy analysis (MSE) in various forms depending on the computational system they are designing. In reference to this computing method, any information stored in signals and utilizing multiscale entropy analysis in the firmware architecture or process can be implemented as part of this method.

Also, there could be infinite possible states due to the variance of latency, and calculations can be probabilistic or deterministic while data processing is deterministic and parallel. Furthermore, operations are recursive, and defined by linear algebra, while circuit behavior is defined by classical physics and topological game theory.

The present invention can be likened to a Blum-Shub-Smale machine that utilizes Kolmogorov complexity and multiscale entropy for signals. This means that it operates on the premise of real numbers.

This invention is further designed to be able to handle the processing of data from machine to machine which can be likened to a distributed grid network. This is because the firmware architecture can support both peer-to-peer signal transmission capabilities and an increase in speed of computing data on signals by itself or other compatible architectures.

It is noteworthy that the higher the number of machines using this method and computing said signal data, the faster the speed and longer the transmission line as opposed to when a single or fewer machines do signal transmission by themselves.

DETAILED DESCRIPTION OF INVENTION

Figure 1:
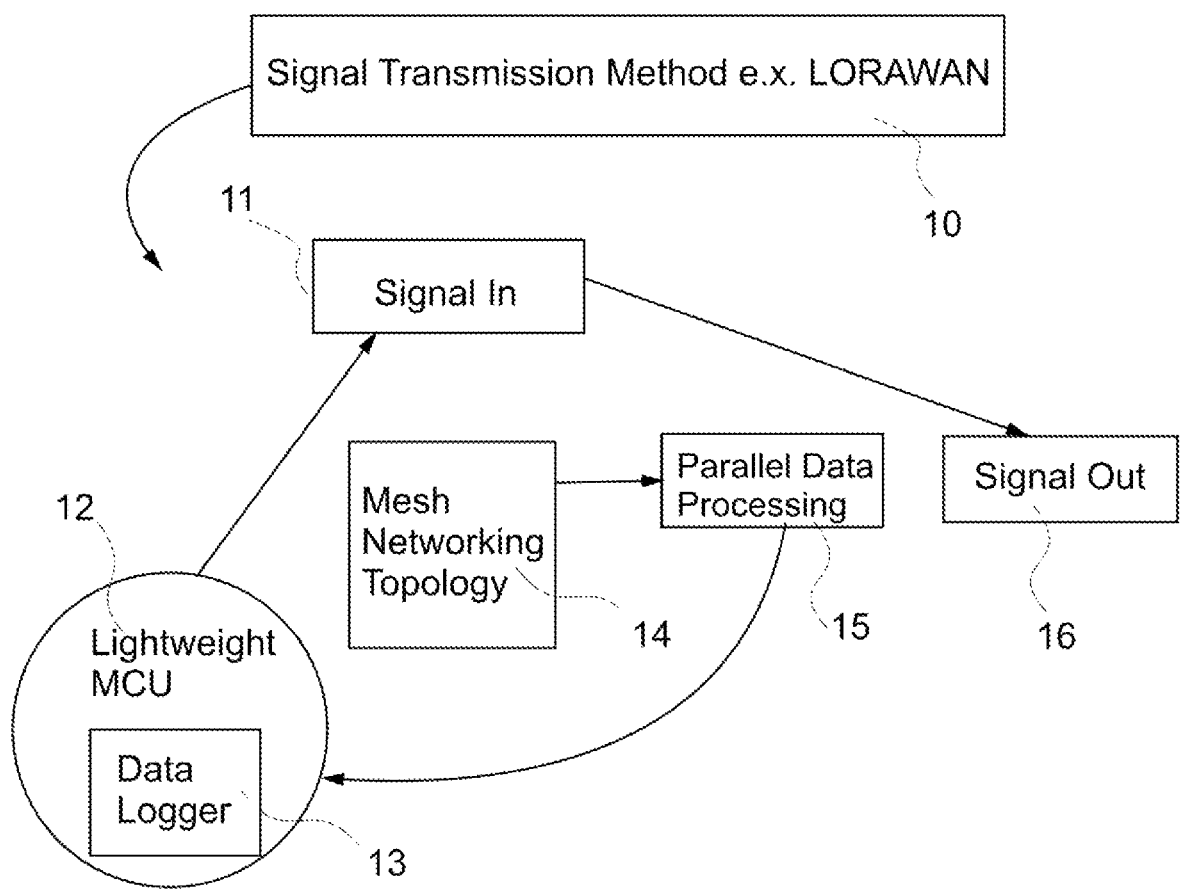
FIG. 1 is a flowchart representation of the signal transmission system of the present invention.

FIG. 1 is a flowchart diagram which illustrates the signal transmission method of the present invention on a computing module. The signal transmission method (10) comprises the implementation of mesh networking topology (peer-to-peer networking capabilities of chipsets) (14), processing of data in parallel (15), a lightweight MCU (12), a data logger (13), signal in (11) and signal out (16).

Figure 2:
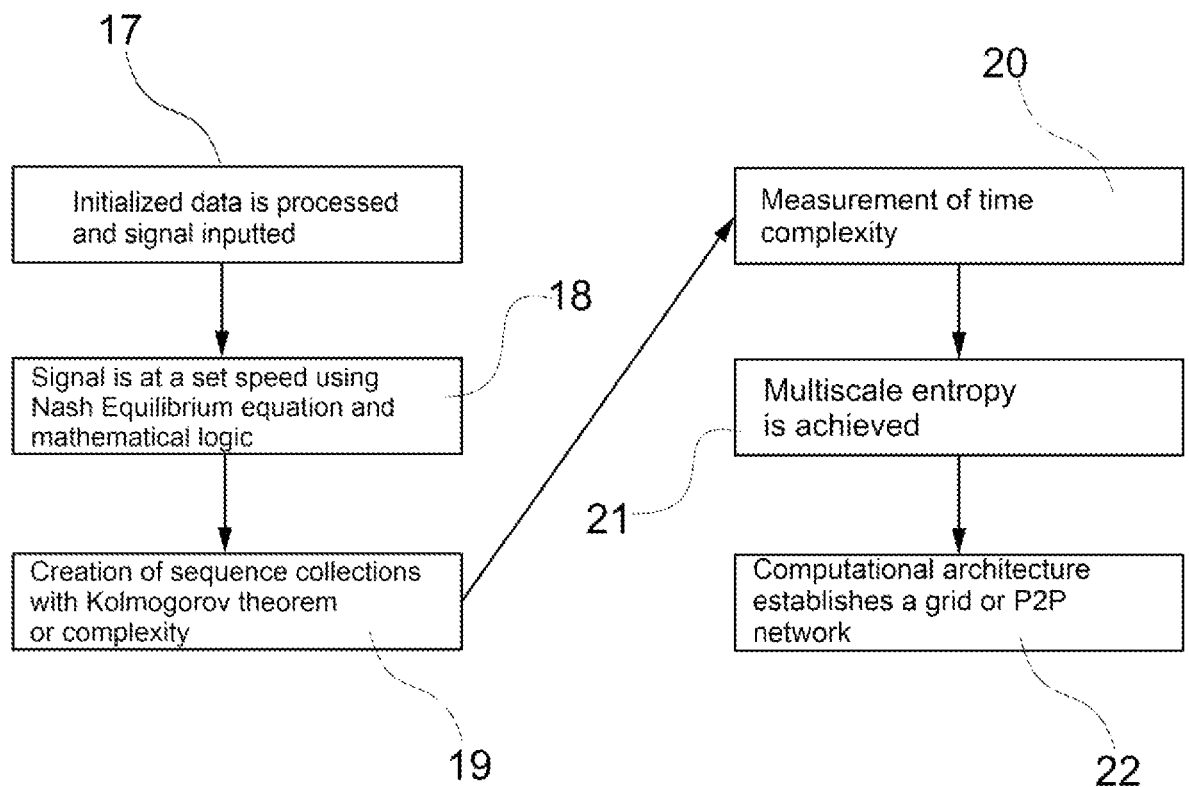
FIG. 2 is another flowchart representation of the steps involved in the application of the present invention.

FIG. 2 is a flowchart diagram which illustrates the steps involved in the application of the present invention comprising:

Step One (17): Data is initialized to be processed and signal is inputted.

Step Two (18): The signal has a set speed already, given the networking method or topology and range latency, and if the signal is set, it shouldn't deviate the order of operations for the set computational processes (this utilizes the Nash Equilibrium equation and mathematical logic). If input A remains constant (which it is), and the signal latency has consistency, there is no change, if latency has no consistency and there are multiple computational inputs, then there is a change even if the inputs are already set and constant given the signal is inconstant. At that point, it goes by optimization and computational complexity.

Step Three (19): Given probabilistic measurements of time complexity, one can utilize the Kolmogorov theorem or complexity for creating a collection of sequences for interval complexity in relation to set processes being computed on signal.

Step Four (20): Time complexity in relation to computational complexity is measured by real numbers and network data access (network memory) which involves the data logger and the MCU for processing signal data to have a set memory that the computing module already has. This implies that given the hardware architecture, it should have some memory allocated for a given task to perform in real time once complexity is figured out. This makes it a type of Blum-Shub-Smale machine.

Step 5 (21): Given the differences in time fluctuations for complexity, and multiple times frames for computation within signals, after you have many processes being computed and signal outputs, you are eventually establishing multiscale entropy and can optimize computationally based of off differences in calculation types or processes and data that need to be ran.

Step 6 (22): The computational architecture can also establish a grid or P2P (peer to peer) network and can optimize processing across networks. Given this, the more compatible architectures within the network, the more optimized speed and range can be, and the more scalable and optimized computations can be. Steps can be run in parallel between each other rather than individually as more architectures join the network or computationally link and process signals together.

Further Explanation

The following operation occurs on a computing module:
You have the development board, the MCUs and chipsets for computational processing in relation to data logging for signals.
When a signal is transmitted, data is being processed as a network packet.
This is the computational method of processing said data through signal packets.
Assuming there is a secondary development board:
Now you have multiple in and out signals across a distributed network.
Data is processed on signal latency and shortest in and out time.
Most of the above operations occur asynchronously and in parallel.

Figure 3:
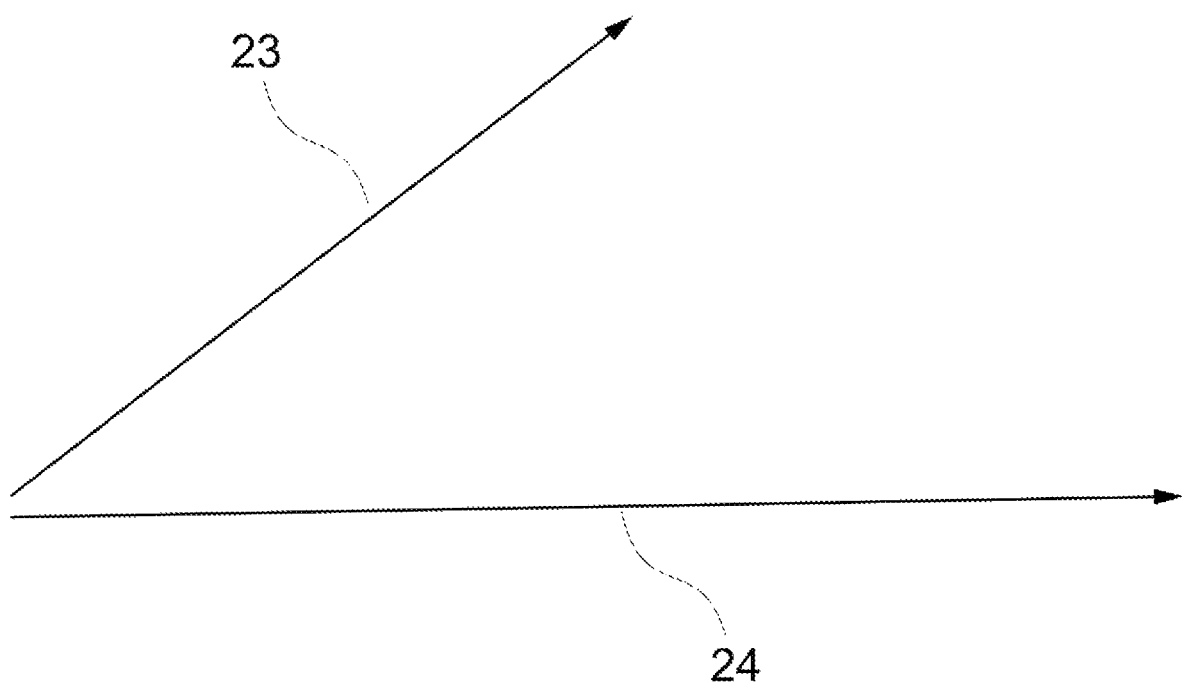
FIG. 3 is a linear diagram conceptualizing the time difference between computation on this computing method versus a classical computing method.

FIG. 3 is a linear representation of the computational time of the present invention as opposed to that of existing methods of computation. It is important to note that time optimization across signals is an important part of being deterministic and on a grid, thereby allowing for a distributed signal consensus model. From the diagram, item 23 represents the time it takes to compute data on this invention's computing method. Lastly, item 24 represents the time it takes for existing computation methods to perform similar operations.

Figure 4:
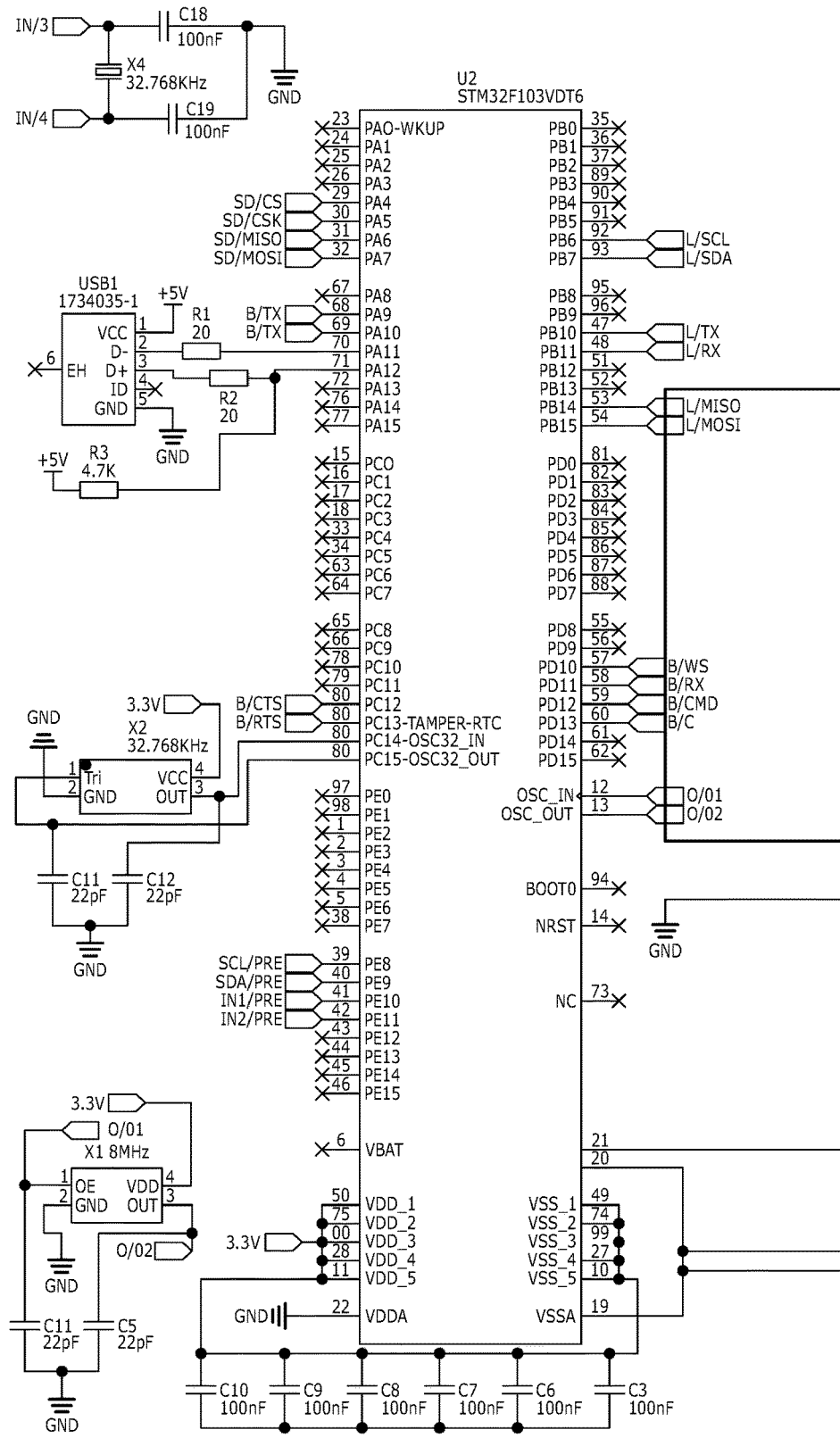
FIG. 4 is a schematic representation of a computing module that implements the process of the present invention.
Figure 4:
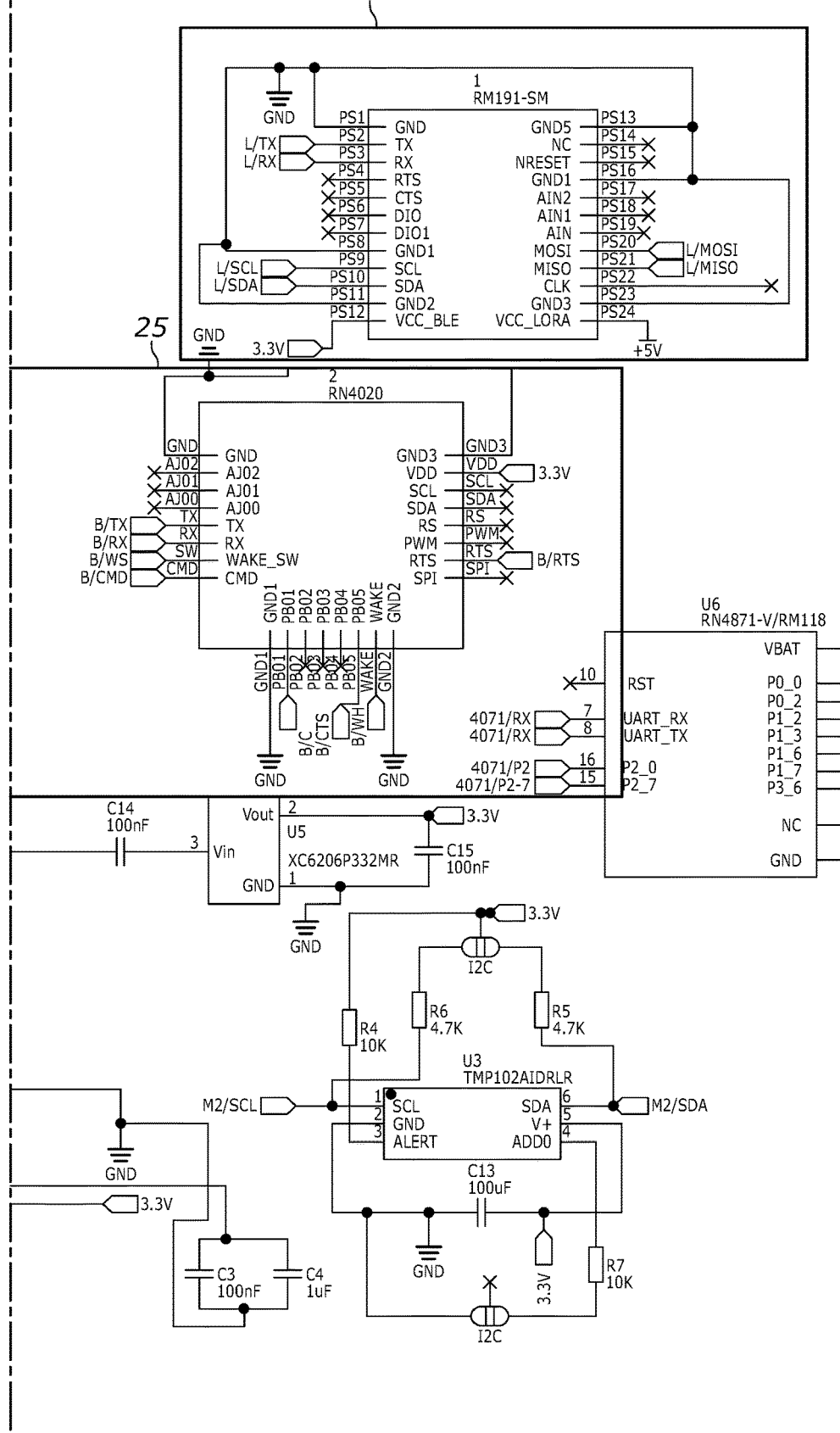
Figure 4:
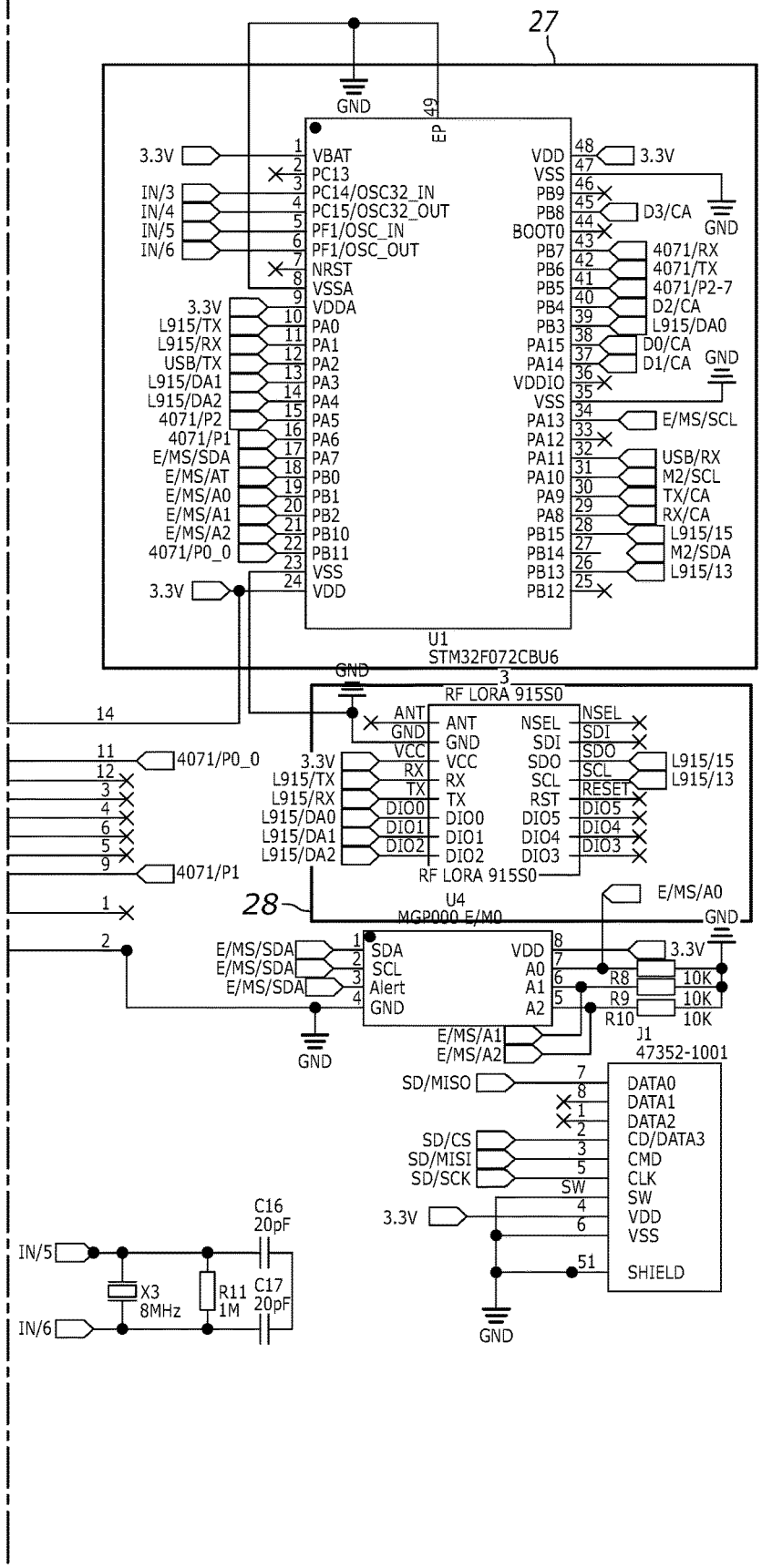
Figure 5:
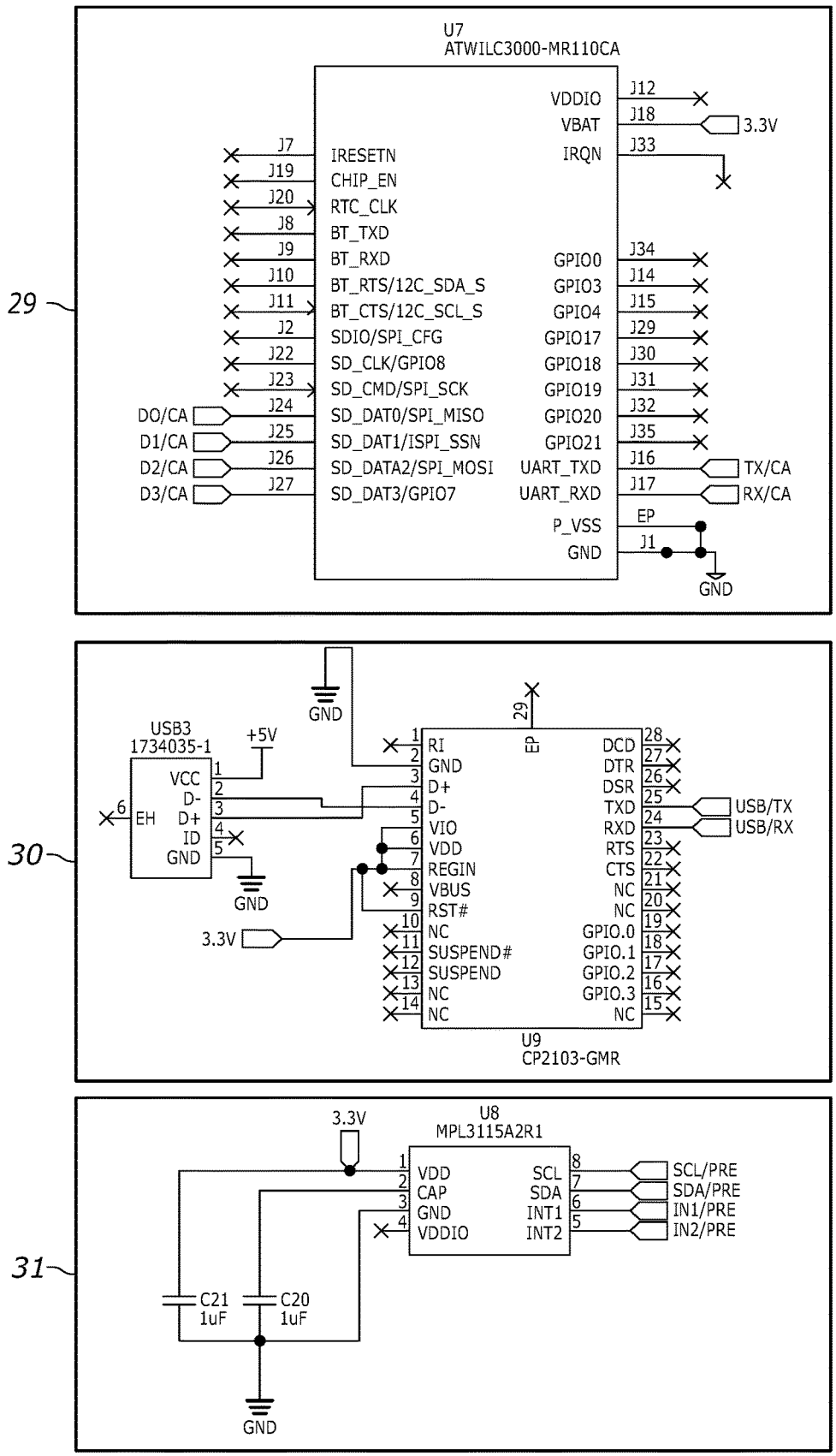
FIG. 5 is an additional schematic representation of that same computing module that implements the process of the present invention.

FIG. 4 is a schematic representation showing an example of a computing module that implements the process of the present invention. This comprises having multiple variations of signal transmission such as LoRaWAN, Lightweight Bluetooth, UART and Lightweight Wireless Signal Transmission. The example computing module comprises a LoRaWAN and Bluetooth module (26), a Low Energy Bluetooth Module (25), a LoRaWAN Transceiver Module (28), a UART module (27), a Bluetooth/Wi-Fi module (29), a Pressure Sensor (31), and a UART module which serves as a USB to UART bridge (30).

The following data below describes the time to signals involved in this process:
  i. Bluetooth: 3 Mb/s:
  ii. LoRaWAN: 37.5 kbit/s
  iii. UART: 32 b/s Amongst all the variations of signal transmission in the present arrangement (LoRaWAN, Lightweight Bluetooth, UART and Lightweight Wireless Signal Transmission), Bluetooth is the fastest in terms of speed, but LoRaWAN has long distance transmission capabilities, while UART is slow but can be used to send some lightweight packets. Ultimately, a user can utilize a mesh variation of LoRaWAN for inner board mesh compatibilities, Bluetooth for data transmission, and UART for sending in small packets and create a shortest time to compute model based off of that.

However, this invention is ideal for any networking communications protocol or combination of networking communication protocols.

Ultimately, the user would want:
  The longest transmission line for mesh networking capabilities, meaning longest signal range network to be utilized for mesh synchronization.
  The fastest communications modules to be utilized for network packet processing in board.
  A lightweight, but slow network which can be utilized for small data payloads.
This can be an example of computation that operates on the premise of real numbers or as a Blum-Shub-Smale machine given that:
  Time to signal can be exponential, have decimal notation, etc.
This is deterministic and ultimately time complexity depends on the:
  Communication protocol
  Potential combination of communication protocols
  Data payload
  Computation based off signal in/out
  The complexity class of the problem being solved i.e., the computation which makes up the payloads.

Regarding payload and computation, the process of signal complexity is also an example of Kolmogorov complexity in relation to the data being processed on signal.
In relation to this computing method:
  Information is stored in signals which is a computational variation of multiscale entropy rather than just 0s and 1s for computation.
  There could be infinite possible states due to the variance of latency.
  Calculations can be probabilistic or deterministic and data processing is deterministic and parallel.
  Operations are recursive and defined by linear algebra.
  Circuit behavior is defined by classical physics and topological game theory.

Definition of Terms

The Mesh Networking Topology: This refers to the P2P (Peer to Peer) networking compatibilities and architecture of said computing chipsets, which allows the user to map out other compatible chipsets for transferring of data as a layered network.

Parallel and Asynchronous Data Processing: It is important to note that the architecture for the chipset design of the present invention can connect to other similar architecture chipsets and process data asynchronously and in parallel.

Lightweight MCU: This refers to a lightweight microcontroller or integrated chip.

A data logger: This refers to the onboard memory of the MCU.

Signal Input: Signal going into the system of the present invention.

Signal Output: This refers to the signal going out of the system of the present invention.

Blum-Shub-Smale machine: This is the invention's machine type that utilizes real numbers and random access to describe computational functions. Blum-Shub-Smale machines are a standard type of machine and computational model in computer science.

Kolmogorov theorem or complexity: This refers to the length of an object or algorithm's optimal specification.

Multiscale entropy: This is the method utilized for this invention's signal time scale analysis. Multiscale entropy is a standard process that can be observed in mathematics, computation, and nature.

Nash Equilibrium equation: The standard Nash Equilibrium equation, is utilized in concept by this invention. The strategy profile is the different computational data types and processes within a chipset, and these types and processes can be different within different computing methods and architectures.

APPLICATION OF THIS INVENTION

There are various ways this invention can be applied including large scale neural networks and AI, medicine, faster 3D printing, localized networks, signal cryptographic schemes and various others.

The invention claimed is:

1. A computing method comprising application of integrated circuits for implementing application specific instructions for computation processing comprising the steps of:
 i. initializing data for processing on at least a primary development board,
 ii. inputting a signal into a data collection component,
 iii. facilitating a signal set speed on said primary development board to prevent deviation from the order of operations for set computational processes, wherein said signal set speed is adapted to maintain synchronization across a network comprising the primary development board and at least a secondary development board,
 iv. utilizing the Kolmogorov theorem or complexity for creating a collection of sequences for interval complexity in relation to set processes being computed on signal,
 v. measuring time complexity by real numbers and network data access, wherein the time complexity measurement involves a data logger and Microcontroller Unit (MCU) for processing signal data to have a set memory,
 vi. establishing and optimizing multiscale entropy based off differences in calculation types or processes and data that needs to be ran, establishing a grid or peer to peer network and optimizing processing across compatible computing methods and chipsets by intelligently manipulating power of computing systems to affect computational speed or bandwidth to maintain synchronization of distributed computing processes.

2. An apparatus configured to implement the method of claim 1, wherein the said integrated circuits implements the application specific instructions on a deterministic pattern based off inner signal communication.

3. An apparatus configured to implement the method of claim 1, wherein the said signal set speed utilizes the Nash Equilibrium equation and mathematical logic in achieving the prevention of deviation from the order of operations for set computational processes.

4. An apparatus configured to implement the method of claim 1, wherein the said measurement of time complexity involves the data logger and the MCU for processing signal data to have the set memory is established and said measurement is considered.

5. An apparatus configured to implement the method of claim 1, wherein the establishment of multiscale entropy is achieved by having a plurality of processes and signal outputs being computed given the differences in time fluctuations for complexity, and multiple time frames for computation within signals.

6. An apparatus configured to implement the method of claim 1, wherein the establishment of the grid or peer to peer network is achieved by running the networks in parallel between each other rather than individually.

7. An apparatus configured to implement the method of claim 1, wherein higher optimized speeds and range of networks as well as more scalable and optimized computations are achieved by facilitating more compatible architectures within the network.

8. An apparatus configured to implement the method of claim 1 or 3, wherein the said signal set speed achieves the prevention of deviation from the order of operations for set computational processes using the Nash Equilibrium equation and mathematical logic.

* * * * *